United States Patent
Foisie

(10) Patent No.: US 8,025,340 B2
(45) Date of Patent: Sep. 27, 2011

(54) BED LEVELING SYSTEM FOR DUMP TRUCK

(76) Inventor: Michael R. Foisie, Higganum, CT (US)

(*) Notice: Subject to any disclaimer, the term of this patent is extended or adjusted under 35 U.S.C. 154(b) by 394 days.

(21) Appl. No.: 12/229,260

(22) Filed: Aug. 21, 2008

(65) Prior Publication Data
US 2010/0045093 A1    Feb. 25, 2010

(51) Int. Cl.
*B60P 1/16* (2006.01)
(52) U.S. Cl. .................... 298/17 S; 280/6.154
(58) Field of Classification Search ............ 298/17 S, 298/17.5, 17.6; 280/6.154; 340/689; 180/41
See application file for complete search history.

(56) References Cited

U.S. PATENT DOCUMENTS

| | | | |
|---|---|---|---|
| 3,464,755 A * | 9/1969 | Brown | 298/22 R |
| 3,640,578 A | 2/1972 | Finney | |
| 4,036,528 A | 7/1977 | Langendorf | |
| 4,129,310 A | 12/1978 | Nordmark | |
| 4,261,616 A | 4/1981 | Beegle | |
| 5,769,502 A | 6/1998 | Bettini | |
| 5,971,493 A | 10/1999 | Robert | |
| 6,027,173 A | 2/2000 | Bettini | |
| 6,641,161 B1 | 11/2003 | McLelland | |

* cited by examiner

*Primary Examiner* — Stephen Gordon
(74) *Attorney, Agent, or Firm* — Roger M. Rathbun

(57) ABSTRACT

A bed leveling system for a dump truck to prevent an imbalance of the truck bed during unloading of material. The system controls the side to side tilt of the truck bed and returns that bed to a generally level orientation when the bed tilt exceeds a predetermined angle. The truck bed is pivotally affixed to the truck chassis through a hinge pin. Thus, the tilting of the dump bed is carried out by a hydraulic system that changes the tilt of the hinge pin. The leveling system includes a cylindrical tube that supports the hinge pin and which is rotatable with respect to the chassis. A roll cylinder rotates the cylindrical tube to change the tilt angle of the hinge pin. A tilt sensor senses the out of level orientation of the truck bed and activates the leveling system to bring the bed back to a generally level orientation.

7 Claims, 8 Drawing Sheets

BED LEVELING SYSTEM FOR DUMP TRUCK

FIELD OF THE INVENTION

The present invention relates to a leveling system for a vehicle and, more particularly, to a leveling system that maintains a generally level orientation of a dump truck bed in a non-level terrain.

BACKGROUND OF THE INVENTION

Dump trucks are, of course, commonly used to transport materials, such as gravel, sand and the like from a source location of the material to a destination where the material is unloaded. In general, the typical dump truck includes a chassis having wheels, engine and a drivers cab and also a dump bed that is pivotally mounted to the chassis along the rear thereof. To unload the material, therefore, there is a hydraulic cylinder that raises the front of the dump bed to an elevated position whereupon the material slides rearwardly to be discharged off of the back of the truck bed.

One of the difficulties with such operation, however, is that that the wheels of the chassis must be stable and, preferably, on a level terrain. If, however, the terrain at the destination is not level, the ground may be tilted or on a hill, the dump truck bed may be tilted side to side, or along its longitudinal axis and the material will not exit the dump bed evenly and, in some instances, the non-level orientation of the dump bed can cause the material to move to one side of the dump bed, thereby unbalancing the dump truck, and potentially causing the entire dump truck to roll over on its side, creating a hazardous situation for the driver as well as other personnel in the area.

Accordingly, it would be advantageous to have a self-leveling system incorporated into the dump truck that would sense an out of level or tilted orientation of the dump truck bed and provide a corrective action by bringing the dump bed back to a generally level orientation so as to avoid an unbalanced condition and potential tipping of the dump truck.

BRIEF SUMMARY OF THE INVENTION

Therefore, with the present invention, the difficulties associated with the unloading of a dump truck on an uneven terrain have been alleviated.

In particular, with the present invention there is provided, a dump truck that has a hinge pin for pivotally mounting the rear of the dump bed to the truck chassis. The dump truck includes a conventional hydraulic main lift cylinder that raises and lowers the front of the dump bed in order to carry out the dumping function and to return the dump bed to its over the road position.

The present leveling system carries out leveling of the dump bed by correcting the tilt of the hinge pin, and therefore the dump bed by the use of certain hydraulic cylinders. In the exemplary embodiment, the hinge pin is connected to a cylindrical tube such that rotation of cylindrical tube also changes the tilt angle of the hinge pin and the rear of the dump bed. A hydraulic roll cylinder causes rotation of the cylindrical tube and thus changes the tilt angle of the dump bed. A further hydraulic stabilizing cylinder moves simultaneously with the roll cylinder and stabilizes the main lift cylinder as the dump bed is tilted.

Initially, the dump bed is elevated to a predetermined position by elevating the front using the main lift cylinder and by elevating the rear of the dump bed by using a hydraulic hinge pin cylinder that raises the hinge pin vertically so that the rear of the dump bed is generally at the same height as the front of the dump bed at a slightly elevated position i.e. about 8-10 inches.

During that elevation, there is a leveling system using cam switches that activates the roll cylinder and the stabilizing cylinder to maintain the truck bed generally level. As the dump bed further raises, the leveling system uses a tilt meter, such as an inclinometer, that controls the roll cylinder and the stabilizing cylinder to return the dump bed to a generally level orientation whenever the inclinometer senses that the dump bed is out of level by a predetermined angle.

These and other features and advantages of the present invention will become more readily apparent during the following detailed description taken in conjunction with the drawings herein.

DETAILED DESCRIPTION OF THE INVENTION

Figure 1:
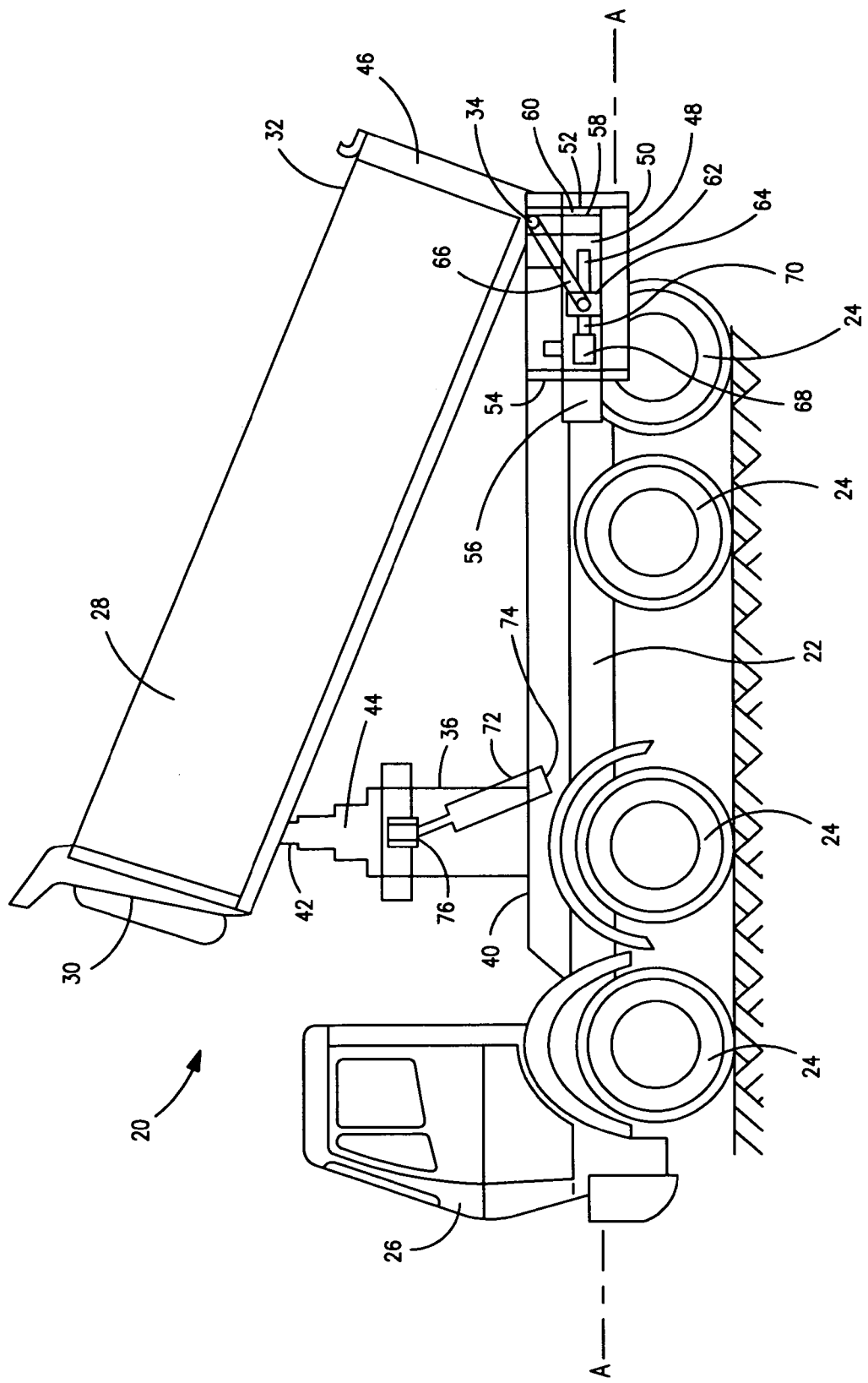
FIG. 1 is a side schematic view illustrating a dump truck incorporating the bed leveling system of the present invention.

Referring now to FIG. 1, there is shown a side schematic view of a dump truck 20 having incorporated therein, the bed leveling system of the present invention. As can be seen, the dump truck 20 includes a chassis 22 having wheels 24 and a cab 26 in a conventional dump truck 20 configuration. The dump truck 20 includes a dump bed 28 having a front 30 and a rear 32, the former facing forwardly toward the cab 26 and the latter facing the rear of the dump truck 20 where the material contained within the dump bed 28 is discharged.

To carry out that discharge of material within the dump bed 28, the dump bed 28 is pivotally mounted to the chassis 22 by means of a hinge pin 34 that passes through the rear 32 of the dump bed 28 such that the dump bed 28 pivots along the hinge pin 34 about a line lateral to the main longitudinal axis A of the dump truck 20. Accordingly, when the operator desires to discharge the material from within the dump bed 28, a hydraulic main lift cylinder 36 is activated that is positioned having a lower end 40 thereof affixed to the chassis 22 and an upper end 42 affixed to the front 30 of the dump bed 28. As such, when the hydraulic main lift cylinder 36 is activated, the piston 44 moves upwardly to raise the front 30 of the dump bed 28, pivot the dump bed 28 about the hinge pin 34, and allow the material to flow by gravity out from the rear 32 of the dump bed 28. The dump bed 28 also had a rear gate 46 that opens as the material is discharged.

As previously explained, however, as long as the wheels 24 are located on solid, level terrain, there is no problem with the stabilization of the dump truck 20 as it is unloading the material contained within the dump bed 28. In the event, however, that the opposite side wheels are resting on uneven ground such that the dump truck 20 is tilted around its longitudinal axis, or, during the dumping process, the wheels on one side of the dump truck sink into soft mud or other situation causing a side to side tilt of the dump truck 20, an imbalance occurs. Thus, the imbalance can not only cause uneven unloading of the material from the dump bed 28, but the imbalance can become severe enough as the material shifts to the low side of the dump truck 20, that the dump truck 20 can tip over on its side thereby putting the driver at risk as well as other personnel in the area.

Accordingly, the present dump truck 20 has incorporated therein a bed leveling system constructed in accordance with the present invention. The bed leveling system includes a cylindrical tube 48 that is rotatably mounted to a generally rectangular frame 50 mounted to and affixed to the chassis 22 by means such as welding. The cylindrical tube 48 is journaled in the rear plate 52 and front plate 54 that are used in constructing the rectangular frame 50 and therefore rotates about the main longitudinal axis of the dump truck 20.

A non-cylindrical extension portion 56 of the cylindrical tube 48 extends outwardly from the front plate 54 for a purpose that will be later explained. As also can be seen, there is a vertical guide groove 58 formed in a side plate 60 of the rectangular frame 50 and the hinge pin 34 is, therefore, vertically movable within the vertical guide groove 58. There is also a through slot 62 formed in the cylindrical tube 48 with bearing pin 64 located in the through slot 62 and passing therethrough. A mechanical link 66 provides a solid connection between the bearing pin 64 and the hinge pin 34. It will be seen that there are really two mechanical links, however, only one is shown in FIG. 1. As such, as the bearing pin 64 slides generally horizontally along the through slot 62 in the cylindrical tube 48, the hinge pin 34, along with the rear 32 of the dump bed 28 moves vertically in the vertical guide groove 58.

There is also a hydraulic hinge pin cylinder 68 that has its piston 70 connected to the bearing pin 64 and can be operable to move the bearing pin 64 horizontally to thereby move the hinge pin 34 vertically. The hydraulic hinge pin cylinder 68 is a single acting cylinder that moves in either direction to cause the hinge pin 34 and the rear 32 of the dump bed 28 to move vertically upwardly or downwardly. In the exemplary embodiment, the hydraulic hinge pin cylinder 68 is located inside the cylindrical tube 48.

A hydraulic stabilizer cylinder 72 is shown that has a lower end 74 affixed to the chassis and the upper end 76 affixed to the hydraulic main lift cylinder 36 at a vertical height above the chassis 22 and which stabilizes the hydraulic main lift cylinder 36 during the operation of the present bed leveling system in an manner and for a purpose that will be later explained.

Figure 2:
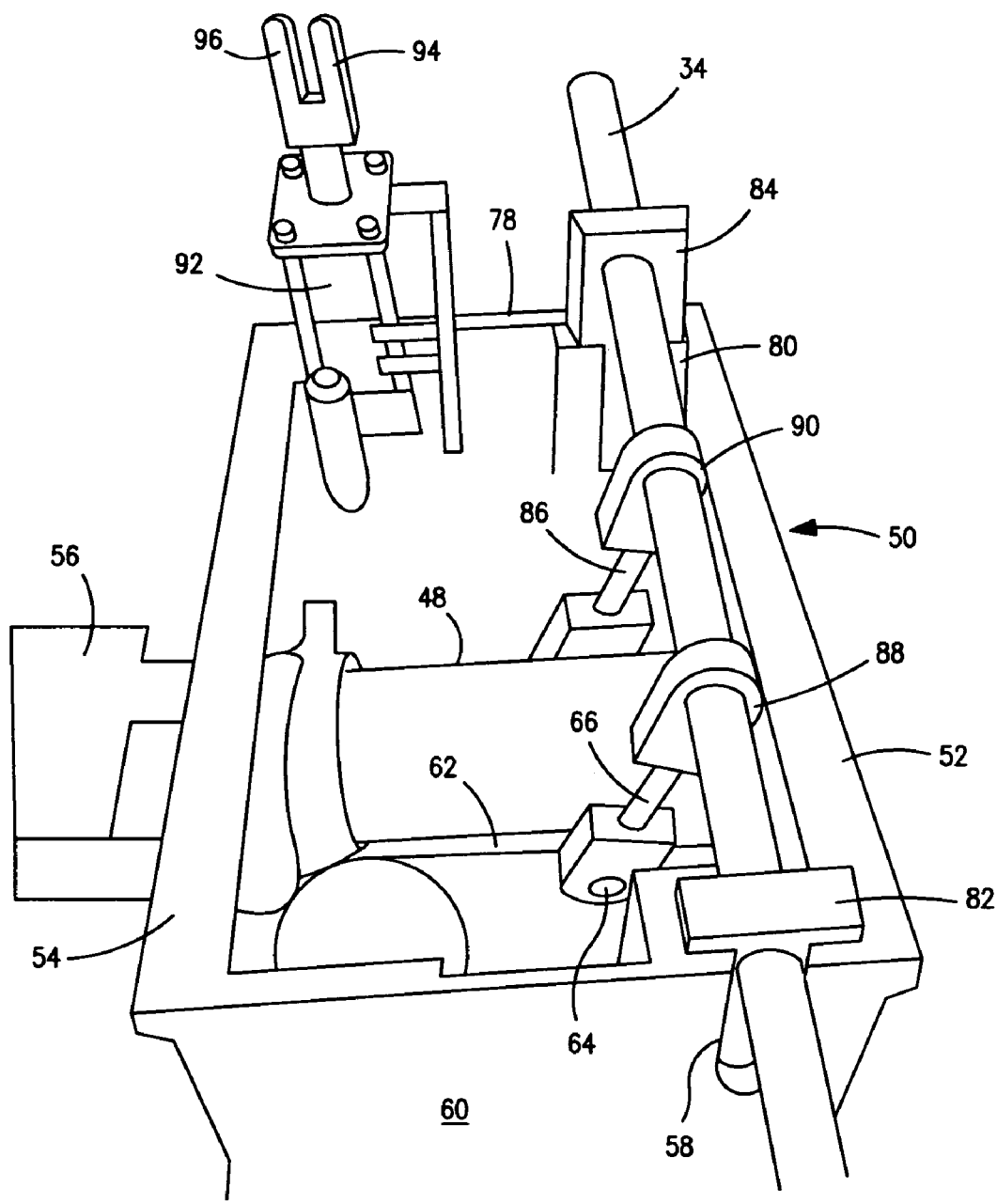
FIG. 2 is a side perspective view of the bed leveling system of the present invention.

Turning now to FIG. 2, there is shown a perspective view illustrating some of the components that are used in constructing the present bed leveling system. As can be seen, the rectangular frame 50 provides a support for various components and includes the rear plate 52, front plate 54, and two oppositely located side plates 60 and 78. Each of the side plates 60, 78 has a vertical guide groove 58, 80 formed therein within which a pair of bearings 82, 84 are vertically slidably mounted therein. The hinge pin 34 is rotatably mounted in the bearings 82, 84. As such, the bearings 82, 84 can move upwardly and downwardly individually within the vertical guide grooves 58, 80 to allow the hinge pin 34 to tilt from side to side about the longitudinal axis of the dump truck 20.

As can also be seen, the mechanical links 66, 86 provide a solid connection between the bearing pin 64 and the hinge pin 34 while allowing the hinge pin 34 to rotatably move within the upper ends 88, 90 of the mechanical links 66, 86. There can also be seen in FIG. 2, a hydraulic roll cylinder 92 having one end 94 thereof affixable to the rectangular frame 50 and having a bifurcated connector 96 that is used to connect the roll cylinder 92 to the cylindrical tube 48 as will later be explained. As shown in FIG. 2, the roll cylinder 92 is pivoted away from its normal working position in order to illustrate the location and mounting of the roll cylinder 92.

Figure 3:
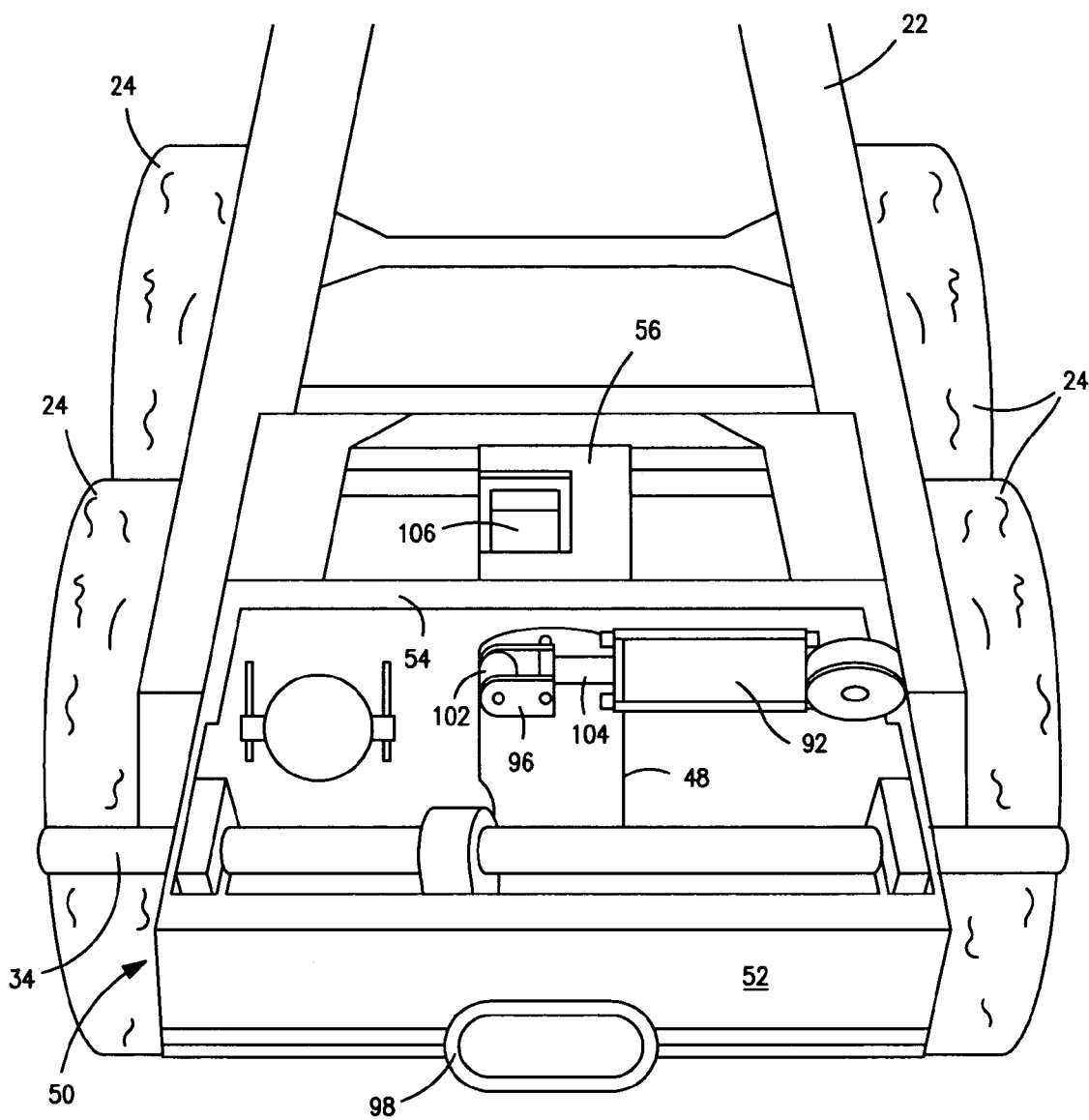
FIG. 3 is a rear perspective view of the bed leveling system.

Turning now to FIG. 3, taken along with FIG. 1, there is shown a rear perspective view illustrating certain components of the present dump truck bed leveling system. In this FIG., there can be seen the rear bearing 98 that is located in the rear plate 52 and which supports and allows the cylindrical tube 48 to rotate with respect to the rectangular frame 50 as well as the chassis 22. There is a similar bearing, a front bearing, not shown in FIG. 3, through which the cylindrical tube 48 passes as it extends through the front plate 54.

As can further be seen, the roll cylinder 92 is in its operative position with the connector 96 affixed to a coupling 102 formed on the cylindrical tube 48. As such, it can be seen the movement of the piston 104 of the roll cylinder 92 can cause the cylindrical tube 48 to rotate about its longitudinal axis. The roll cylinder 92 is a double acting cylinder such that the piston 104 can be both extended or retracted depending upon the flow of the hydraulic fluid in the roll cylinder 92 so as to rotate the cylindrical tube 48 either clockwise or counterclockwise about its longitudinal axis.

In FIG. 3, there also may be seen the extension portion 56 of the cylindrical tube 48 that extends outwardly from the front plate 54 of the rectangular frame 50 and which rotates along with the rotation of the cylindrical tube 48. There is also an tilt sensor, such as an inclinometer 106 that is affixed to the extension portion 56 that which senses the angle of the cylindrical tube 48 along with other components with respect to the horizontal. The inclinometer 106 can be a commercial device and one of which is available from the Reiker Company and sends a signal when the tilt angle of the cylindrical tube 48 is a predetermined degree off of the horizontal. Due to the fixed relationship between the cylindrical tube 48 and the hinge pin 34, it can be seen that the inclinometer 106 senses the angle of the hinge pin 34 as well as the rear 32 of the dump truck 20 from the horizontal.

In the exemplary embodiment, the inclinometer 106 senses that tilt angle and sends a signal if the dump bed 28 is tilted 3 degrees or more with respect to the horizontal, however, obviously other angles could be used as the predetermined angle for producing a signal.

Figure 4:
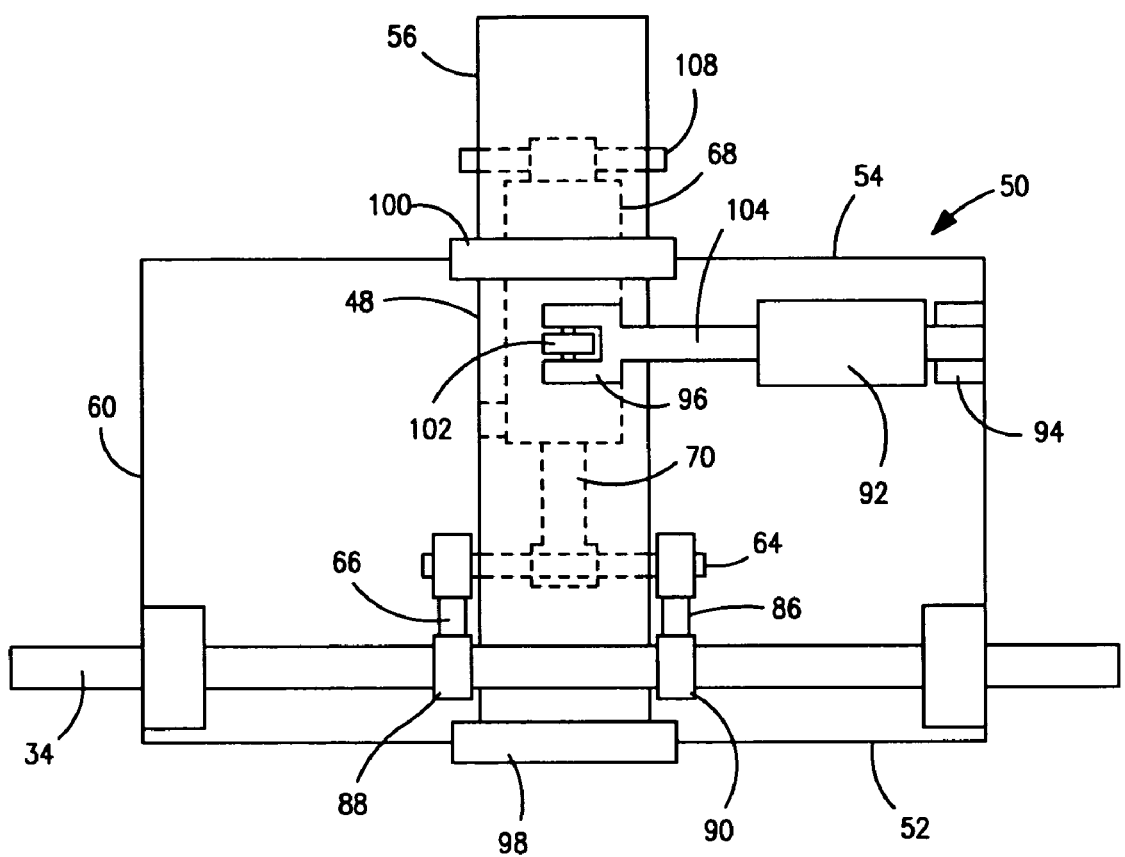
FIG. 4 is a schematic view of the present bed leveling system.

Turning now to FIG. 4, there is a schematic view of certain components of the present bed leveling system for a dump truck. In this FIG. it can be seen that the cylindrical tube 48 is rotatably affixed to the rectangular frame 50 by means of the rear bearing 98 and a front bearing 100 that are located, respectively in the rear plate 52 and the front plate 54 of the rectangular frame 50. The hinge pin cylinder 68 is located internal of the cylindrical tube 48 and has one end affixed thereto by a fixed pin 108 whereas the piston 70 is affixed to the two mechanical links 66, 86 by means of the bearing pin 64. The other ends of the mechanical links 66, 86 are affixed to the hinge pin 34 while allowing the hinge pin 34 to rotate therein.

As can also be seen, the roll cylinder 92 has one end 94 affixed to the rectangle frame 50 by a pivotable mount and its connector 96 is connected to the coupling 102 of the cylindrical tube 48, there allowing the action of the roll cylinder 92 to rotate the cylindrical tube 48 along with the hinge pin 34 from side to side about the longitudinal axis of the dump truck 20 (FIG. 1).

Accordingly, as can be seen by FIGS. 1-4, the operation of the described portion of the bed leveling system can be described. As shown, the hinge pin 34, along with the rear 32 of the dump bed 28 (FIG. 1) can be raised and lowered by use of the hydraulic hinge pin cylinder 68 located within the cylindrical tube 48. As the piston 70 of the hinge pin cylinder 68 is extended and retracted, the bearing pin 64 moves horizontally along the through slot 62, causing the mechanical links 66, 86 to raise and lower the bearings 82, 84, thereby moving the hinge pin 34 as well as the rear 32 of the dump bed 28 upwardly and downwardly.

As to the correction of the tilt angle of the dump bed 28, the roll cylinder 92 can be moved in either direction, that is, the piston 104 can be extended or retracted such that the movement of the piston 104 rotates the cylindrical tube 48 either clockwise or counterclockwise about its longitudinal axis. Since the cylindrical tube 48 is affixed to the hinge pin 34 through the mechanical links 66, 86, the rotation of the cylindrical tube 48 causes the dump body 28 to rotate about the longitudinal axis of the dump truck 20 to change the side to side tilt of the dump bed 28.

Accordingly, during the unloading of the dump truck 20, if the truck bed 28 becomes tilted out of the horizontal in excess of 3 degrees to the horizontal, the inclinometer 106 senses that deviation from the horizontal and energizes the roll cylinder 92 to move the cylindrical tube 48 in the direction counter to that tilt angle and the rotation of the cylindrical tube 28 returns the hinge pin 34 as well as the dump bed 22 to a generally horizontal orientation.

Figure 5:
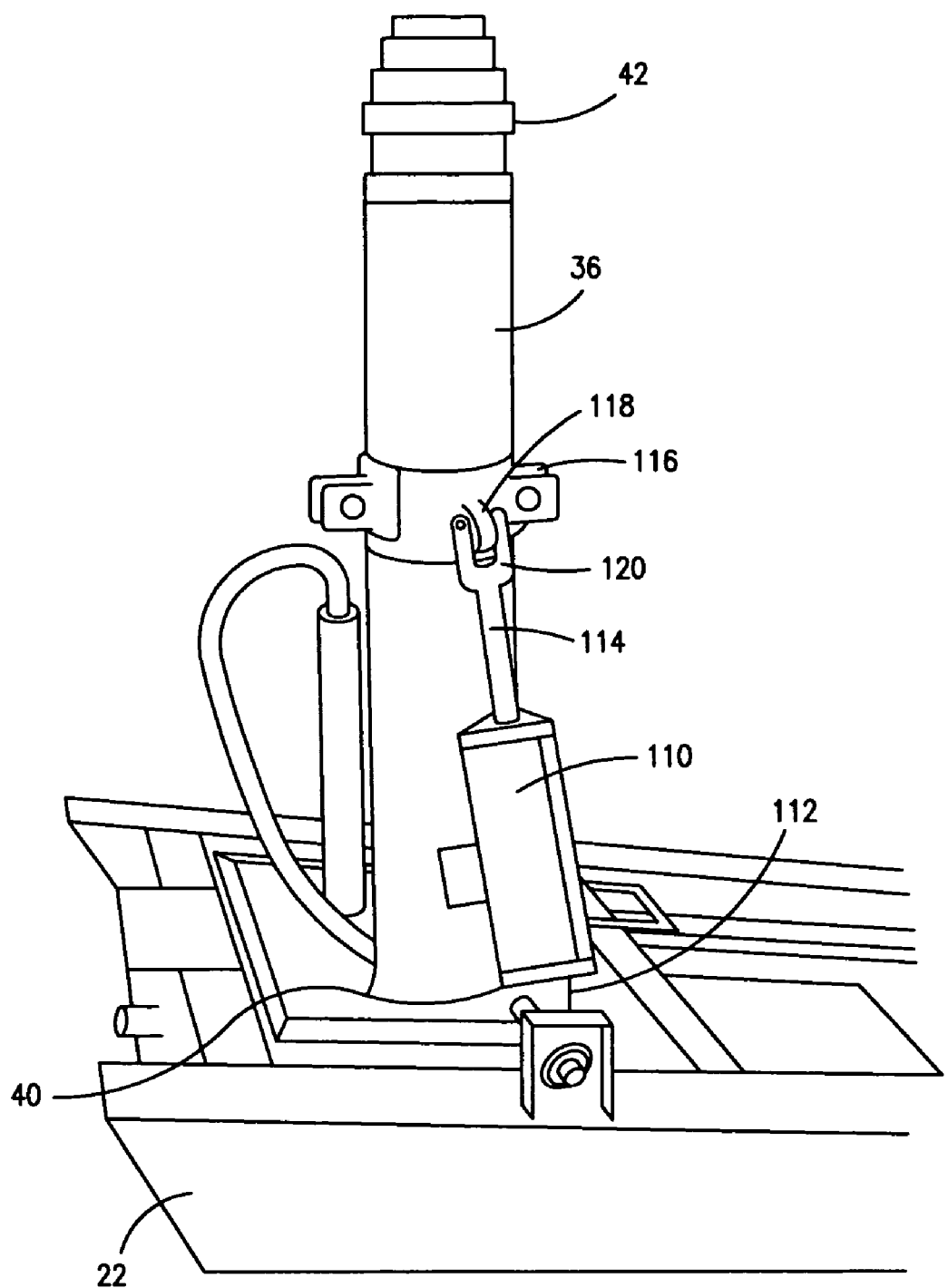
FIG. 5 is a side perspective view of the chassis of the present dump truck and illustrating the hydraulic main lift cylinder and hydraulic stabilizing cylinder.

Turning next to FIG. 5, taken along with FIG. 1, there is a perspective view showing the location and mounting of the hydraulic main lift cylinder 36. As can be seen, the main lift cylinder 36 has its lower end 40 mounted to the front area of the chassis 22 and its upper end 42 extends upwardly and is attached to the front 30 of the dump bed 22.

The lower end 40 of the main lift cylinder 36 is preferably affixed to the chassis 22 by a gimbaled construction such that the lower end 40 of the main lift cylinder 36 can move both in the direction of back and forth with respect to the longitudinal axis of dump truck 20 as well as side to side thereto and which facilitates the tilting of the dump bed 28 by means of the present tilting system. There is also a hydraulic stabilizing cylinder 110 that has a lower end 112 affixed to the chassis 22 and the piston 114 affixed to the main lift cylinder 36 at an elevated location therealong. That affixation can be by means of a collar 116 that surrounds the main cylinder 36 and has an eye 118 of the collar that is affixed to a bifurcated connector 120 located at the distal end of the piston 114.

Accordingly, in the operation of the stabilizing cylinder 110, and, as will be later explained, as the roll cylinder 92 extends or retracts to change the tilt angle of the dump bed 28, there is a simultaneous and coordinated movement of the stabilizing cylinder 110 to provide additional stability to the main lift cylinder 36 as it moves side to side with the tilting of the dump bed 28 in the use of the present dump bed tilting system.

Figure 6:
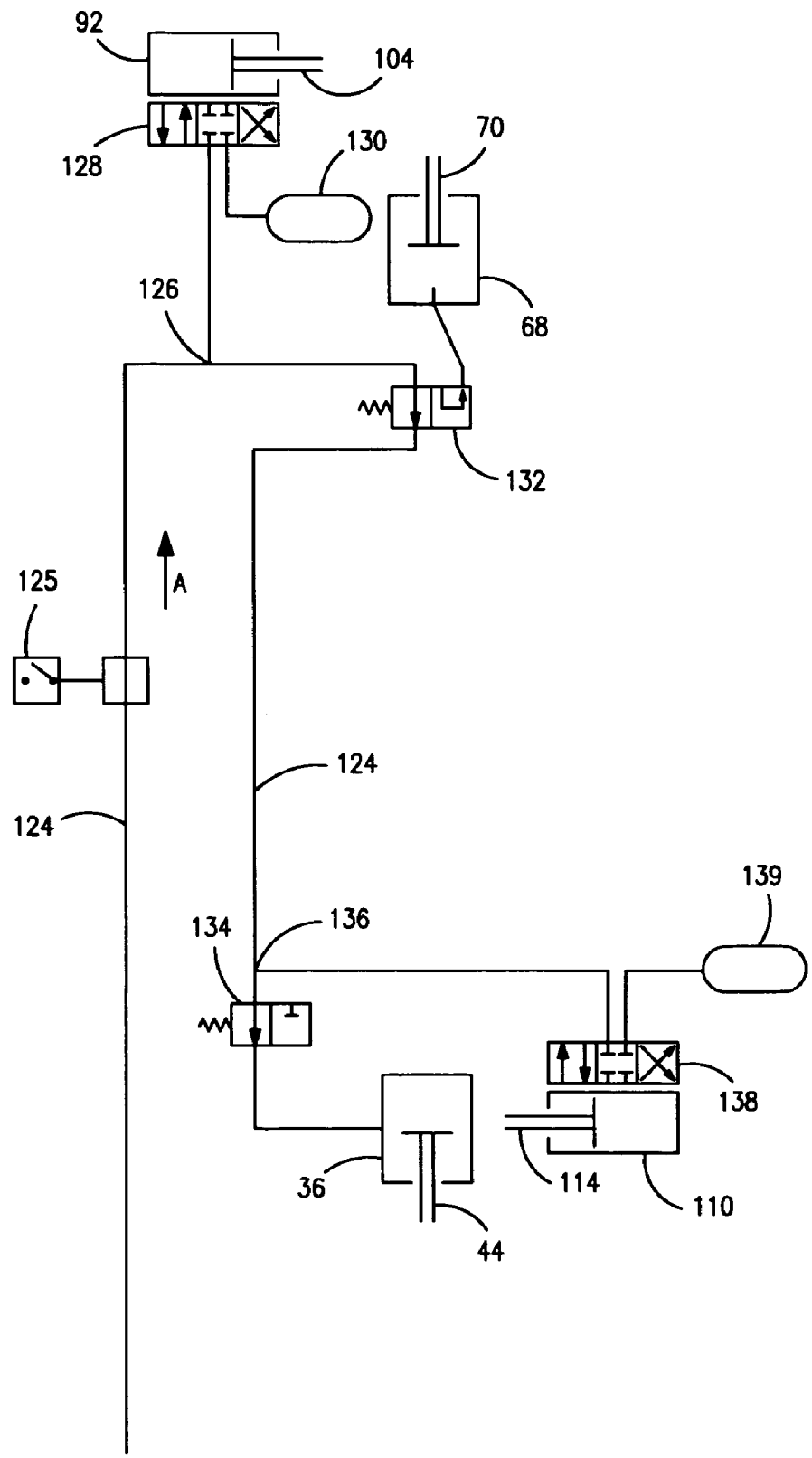
FIG. 6 is a schematic view illustrating a hydraulic system usable with the present invention.

Turning now to FIG. 6, taken along with FIGS. 1-5, there is schematic view of an exemplary hydraulic system used with the present invention. In FIG. 6, there can be seen the main hydraulic line 124 that supplies the hydraulic fluid to the system when the user activates the lift control. The hydraulic fluid is supplied under sufficient pressure from a main fluid pump that is a conventional system on dump trucks. There is a flow switch 125 provided in the main hydraulic line 124 that closes whenever there is a flow in the main hydraulic line 124 in the direction indicated by the arrow A, that is, whenever the hydraulic fluid is flowing toward the main lift cylinder 36. The purpose and use of the flow switch 125 will be later explained.

The supply of pressurized fluid is connected by a tee 126 to a three position solenoid operated roll cylinder valve 128 and which controls the movement, including the direction of movement, of the piston 104 moving within the roll cylinder 92. As can be seen, the roll cylinder valve 128 has a center position where no hydraulic fluid is supplied to the roll cylinder 92 and thus it is stationary, and left and right positions where the hydraulic fluid is supplied to either side of the roll piston 104 to move it in either direction within roll cylinder 92. In each of the moving positions, the return fluid is directed to an accumulator 130.

There is also a hinge pin cylinder valve 132 that is also supplied with pressurized hydraulic fluid from the main hydraulic line 124 and is a two position solenoid operated valve. Thus, in one position, the hydraulic fluid from the main hydraulic line 124 passes through the hinge pin cylinder valve 132 and continues through the main hydraulic line 124 and in the other position, all of the hydraulic fluid passes through the hinge pin cylinder valve 132 and enters the hinge pin cylinder 68 so as to move the hinge pin piston 70, which, as explained, moves the hinge pin 34 into an predetermined elevated position.

Continuing, the main hydraulic line 124 is connected to the main lift cylinder 36 where the pressurized hydraulic fluid can raise and lower the piston 44 in raising and lowering the front 30 of the dump bed 28 to carry out the unloading of the material within the dump bed 28. There is a flow interrupt valve 134 that can be used to stop and continue the flow of hydraulic fluid to the main lift cylinder 36. As will be seen, any time the bed leveling system is in operation, that is, whenever the roll cylinder 92 and the stabilizing cylinder 110 are being operated, controlled either by the inclinometer 106 or other means, the flow interrupt valve 134 is energized, thereby blocking all flow of hydraulic fluid to the main lift cylinder 36 such that the bed leveling system is prioritized. It should also be noted that when the hinge piston 70 is moving, all of the hydraulic fluid is supplied to the hinge pin cylinder 68 and no hydraulic fluid is being supplied to the main lift cylinder 36 such that the raising of the dump bed 28 ceases when the hinge pin 34 is being moved vertically upwardly. As explained, the flow of hydraulic fluid to the main left cylinder 36 also ceases when leveling of the dump bed 28 is taking place.

There is a further tee 136 off of the main hydraulic line 124 that directs pressurized hydraulic fluid to the stabilizing cylinder 110 that operates the stabilizing piston 114 in stabilizing the main lift cylinder 36 as previously explained during operation of the present bed leveling system. Again, there is a three position, solenoid operated stabilizing cylinder valve 138 that controls the motion and direction of the stabilizing piston 114. As can be seen, again there is a mid position where no hydraulic fluid is supplied through the stabilizing cylinder valve 138 to the stabilizing cylinder 110 and thus it is motionless as well as left and right positions that move the stabilizing piston 114 in opposite directions. As before, there is an accumulator 139 to receive the flow of hydraulic fluid from the stabilizing cylinder 110 as the piston 114 moves in either direction.

Figure 7:
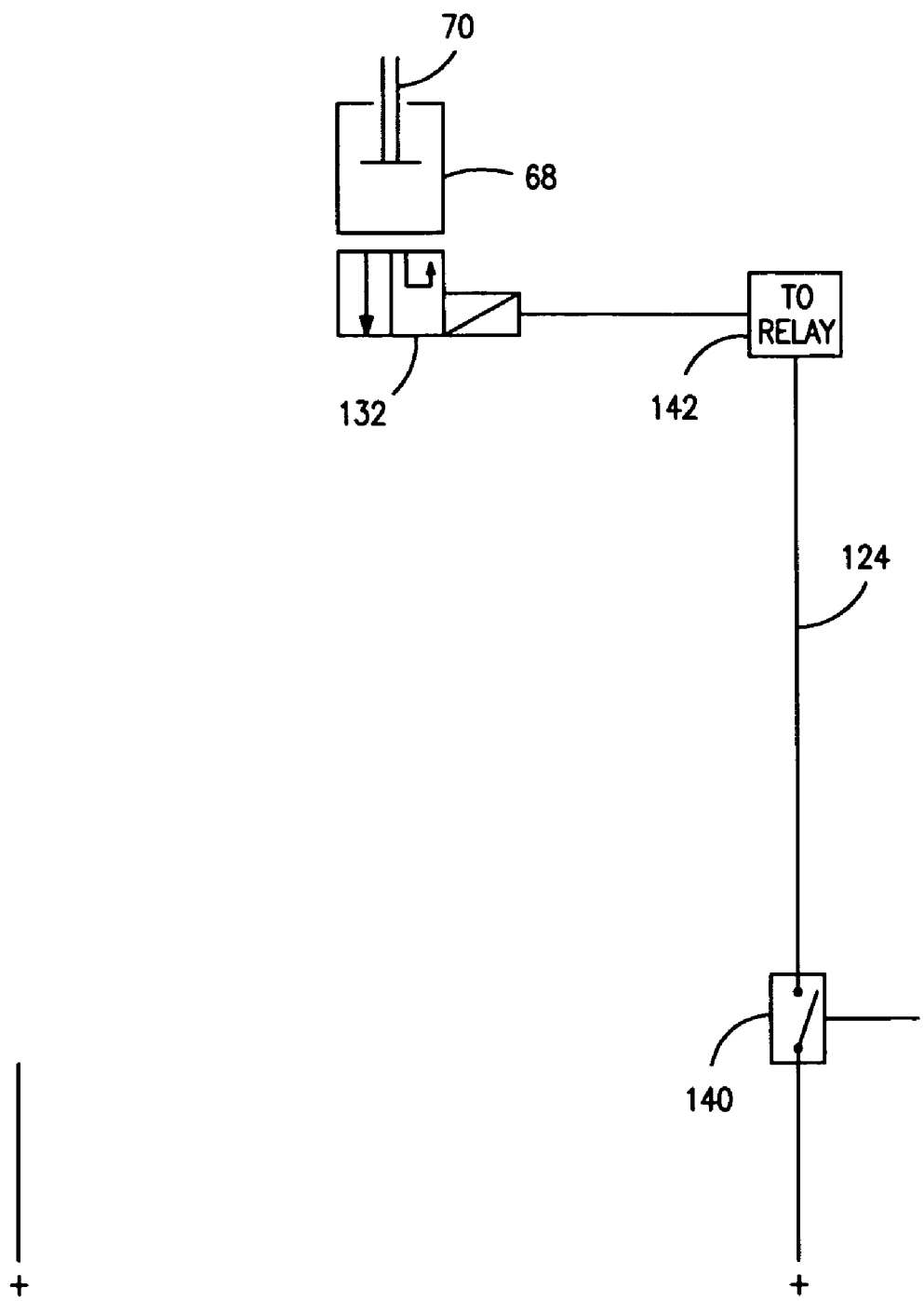
FIG. 7 is a schematic view illustrating a portion of an electrical system usable with the present invention.
Figure 8:
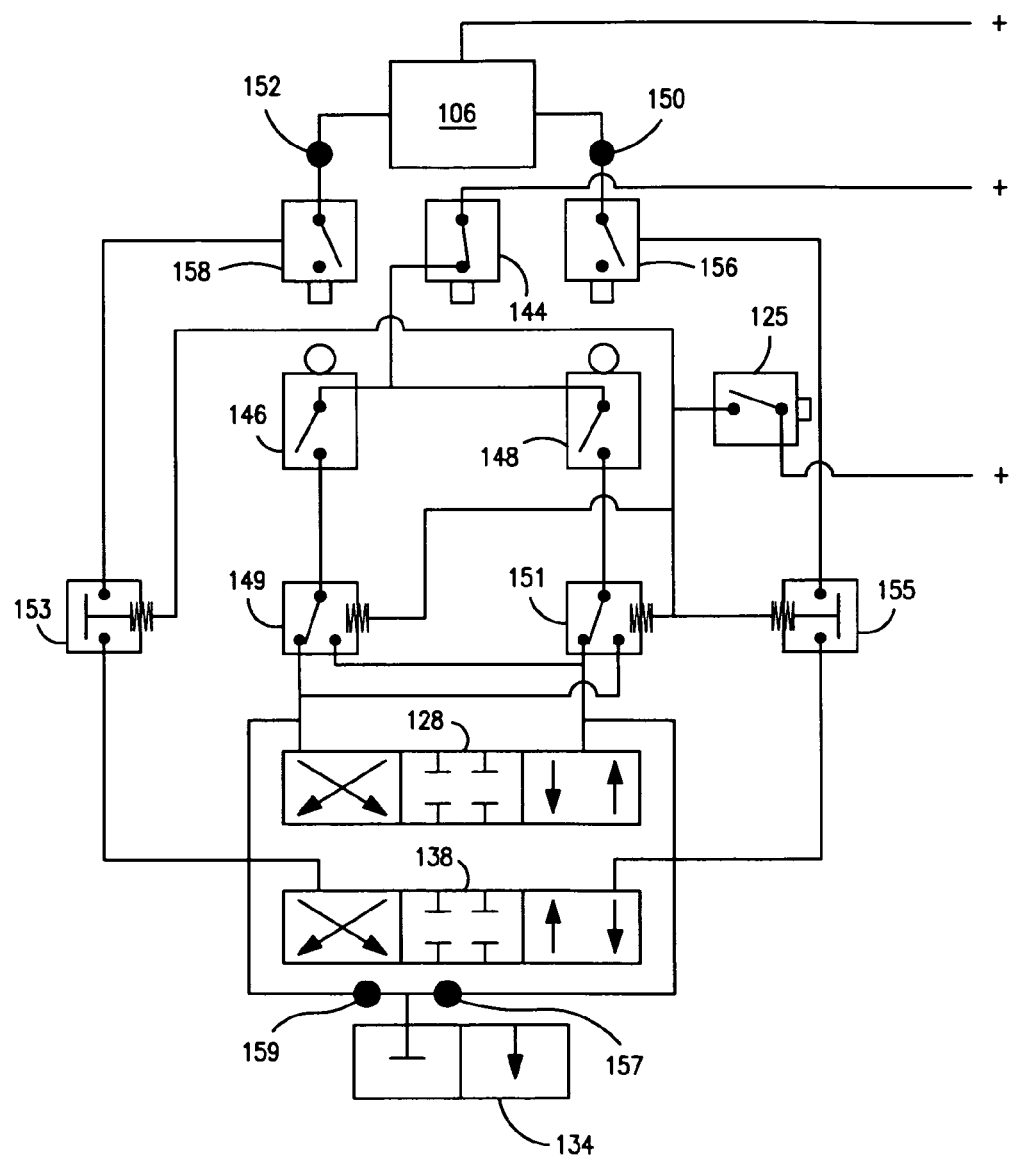
FIG. 8 is a schematic view illustrating a further portion of an electrical system usable with the present invention.

Turning then to FIGS. 7 and 8, taken along with FIGS. 1-6, there is shown an electrical system for the present bed leveling system. In FIG. 7, there is an electrical system for operating the hinge pin cylinder valve 132. The flow of pressurized hydraulic fluid is initiated by the truck operator at the power take-off to supply that pressurized hydraulic fluid to main hydraulic line 124. As such, the main lift cylinder 36 begins to lift the front 30 of the dump bed 28. After an initial lift of about 8-10 inches, the front 30 of the dump bed 28 hits a limit switch 140 which activates a time delay relay 142. The time delay relay 142 preferable has a predetermined delay of about 5 seconds.

The time delay relay 142 sends a signal to the hinge pin cylinder valve 132 to move that valve from its closed position to its open position wherein hydraulic fluid is totally diverted from the main lift cylinder 36 and instead enters the hinge pin cylinder 68 so as to move the hinge pin piston 70 and raise the hinge pin 34 (along with the rear 32 of the dump bed 28) as previously explained. As such, both the front 30 of the dump bed 28 and the rear 32 of the dump bed are initially raised to a predetermined height and, in the exemplary embodiment, that height is about 8-10 inches.

During the time period that the dump bed 28 being raised to the predetermined height, there is an intermediate leveling system based upon cam switches. As such, as the rear 32 of the dump bed rises, power is supplied through a closed limit switch 144 to reach and energize cam switches 146 and 148 and those switches are activated by a cam on each side of the dump bed 28 depending on the angular orientation of the dump bed 28. Basically if the dump bed 28 is tilted too far in one direction, one of the cam switches is activated and the same is true if the dump bed 28 is tilted too far in the opposite direction whereupon the other cam switch is activated. The current direction of the cam switches 146 and 148 is, however, dependent upon the flow of hydraulic fluid in the direction of arrow A. When flow is present, relays 149 and 151 are energized and intermediate leveling will occur. Conversely, without flow in the direction of arrow A, relays 149 and 151 serve to reverse the function of cam switches 146, 148 for assistance of leveling when the dump bed 28 is traveling downwardly.

As can be seen, each of the cam switches 146, 148 is electrically connected to both the roll cylinder valve 128 and the stabilizing cylinder valve 138 through relays 149, 151 such that the activation of one or the other of the cam switches 146, 148 can operate both the roll cylinder piston 104 and the stabilizing cylinder piston 114 simultaneously to counter whatever tilt is sensed, that is, whatever direction of tilt is sensed, both the roll cylinder 92 and the stabilizing cylinder valve 138 act to offset that tilt angle and bring the dump bed 28 to a level orientation. As explained, when the leveling system is in operation, the hydraulic fluid is diverted from the main lift cylinder 36 by the simultaneous energizing of the flow interrupt valve 134 and is directed to the roll cylinder 92 and stabilizing cylinder 110 such that the upward movement of the front 30 of the dump bed 28 is ceased until the dump bed 28 is brought into a level orientation.

Once the dump bed 28 has reached the predetermined level height, that is, 8-10 inches, three limit switches 144, 156, 158 are contacted. With that contact, limit switch 144 opens, thereby deactivating the cam switches 146 and 148 while cam limit switches 156 and 158 are closed, thereby activating the inclinometer 106. Throughout the further elevation of the dump bed 28, there is a positive flow of hydraulic fluid in the direction of arrow A and therefore the flow switch 125 is energized providing the power to the single pole, single throw solenoid switches 153, 155 to power up the roll cylinder valve 128 and stabilizing cylinder valve 138. At this point, therefore, the inclinometer 106 controls the leveling system throughout the continued raising of the front 30 of the dump bed 28.

As such, for so long as there is a positive flow of hydraulic fluid through the main hydraulic line 124 in the direction of arrow A, the inclinometer 106 will control the leveling system by controlling the roll cylinder valve 128 and the stabilizing cylinder valve 138 to return the dump bed 28 to a generally level orientation whenever the tilt angle of the dump bed 28 exceeds the predetermined tilt angle, i.e. 3 degrees.

As further components, there are diodes 150, 152 provided at both outputs of the inclinometer 106 to prevent any reverse current from affecting the inclinometer. Further diodes 157, 159 are provided to prevent reverse current when the flow interrupt valve 134 is energized.

As such, in the reverse direction, that is, when the front 30 of the dump bed 28 is descending, there is no longer a flow in the main hydraulic line 124 in the direction of the arrow A and, therefore, the flow switch 125 moves to the off position, thereby disabling the inclinometer during the entire descent of the front 30 of the dump bed 28.

As the front 30 descends, however, it again passes by and activates the limit switch 140 (FIG. 7). The limit switch 140 thereby, upon activation, signals relay 142, opens valve 132, so as to release the hydraulic fluid in cylinder 68 and thereby retracts piston 70. The retraction of piston 70 is assisted by truck air through the rod end of the hinge pin cylinder 68. As such, both of the pistons 114 and 104, respectively of the stabilizing cylinder 110 and the roll cylinder 92 also are returned to their retracted, at rest, positions. At the same time, the piston 70 of the hinge pin cylinder 68 also returns to its retracted position such that the hinge pin 34 descends downwardly to its lowered position.

As this occurs, mechanical links 86, 88 disengage with limit switches 144, 156 and 158, thereby returning the roll function back to cam switches 146, 148. Since flow in the direction of the arrow A is not present, the single pole, double throw relays 149, 151 remain in a de-energized state which is in contrast to the presence of a positive flow in the direction of arrow A, such that solenoid valves 128, 138 are actuated opposite of their normal functions. This reverse function allows accumulator 130 and 139 to exhaust pressure and hydraulic fluid from roll cylinder 92 and stabilizing cylinder 110 which, in turn, rolls dump bed 28 back to chassis 22.

Thus, the dump bed 28 is again righted with respect to the chassis 22, the rear 32 of the truck bed 28 has been lowered to its original position and the dump truck 20 has returned to its over the road configuration.

Those skilled in the art will readily recognize numerous adaptations and modifications which can be made to the truck bed leveling system of the present invention which will result in an improvement in maintaining the bed of a dump truck in a generally level orientation, yet all of which will fall within the scope and spirit of the present invention as defined in the following claims. Accordingly, the invention is to be limited only by the following claims and their equivalents.

What is claimed is:

1. A dump truck having a leveling system for leveling a dump bed comprising:

a chassis having wheels and a dump bed having a front and a rear, the dump bed being pivotally mounted to the chassis by means of a hinge pin located at the rear of the dump bed, a hydraulic main lift cylinder having one end affixed to the chassis and another end affixed to the front of the dump bed to raise and lower the front of the dump bed, the leveling system including a cylindrical tube rotatably mounted with respect to the chassis along a longitudinal axis of the dump bed, the cylindrical tube being affixed to the hinge pin such that rotation of the cylindrical tube rotates the hinge pin and the rear of the dump bed in a side to side tilting motion about the longitudinal axis of the dump bed, and a tilt sensor adapted to sense the orientation of the dump bed with respect to the horizontal and to activate the leveling system to move the hinge pin and the dump bed to a generally horizontal orientation whenever the dump bed is sensed by the tilt sensor to be at least a predetermined angular deviation from level.

2. The dump truck of claim 1 wherein the cylindrical tube is rotated by a hydraulic roll cylinder.

3. The dump truck of claim 1 wherein the predetermined angular deviation from level is about 3 degrees.

4. The dump truck of claim 1 wherein the tilt sensor is affixed to the cylindrical tube.

5. The dump truck of claim 2 wherein the system includes a hydraulic stabilizing cylinder having one end affixed to the chassis and another end affixed to the main lift cylinder and which operates simultaneously with the hydraulic roll cylinder to provide stability to the hydraulic main lift cylinder.

6. The dump truck of claim 1 wherein the system includes a hydraulic hinge pin cylinder adapted to move the hinge pin in a vertical direction.

7. The dump truck of claim 6 wherein the hydraulic hinge pin cylinder is located within the cylindrical tube.

* * * * *